July 21, 1936.   M. PETERSON   2,048,217
WINDSHIELD HEATER
Filed Dec. 16, 1935
Fig. 1.
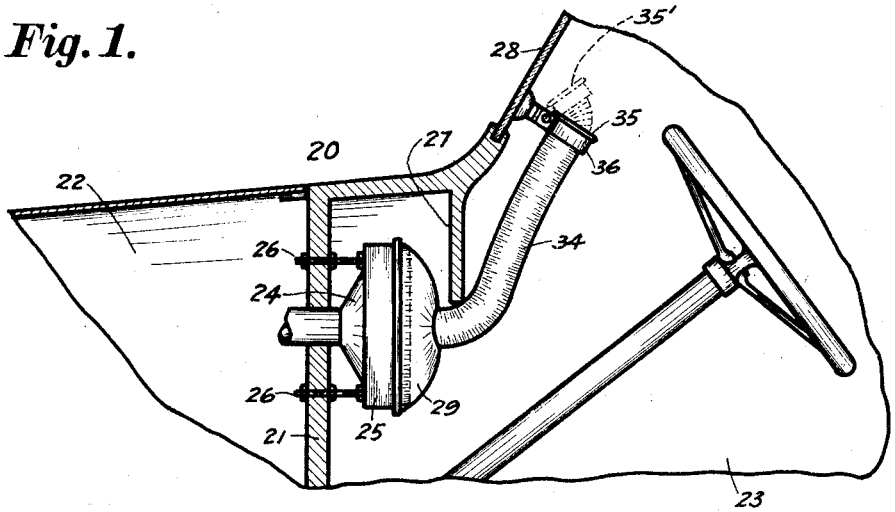
Fig. 2.
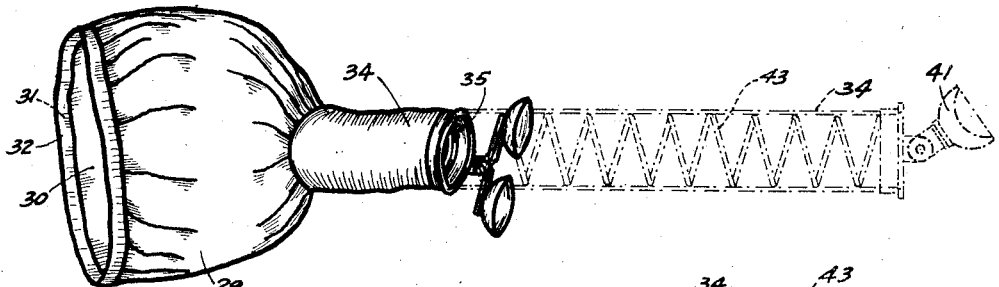
Fig. 3.
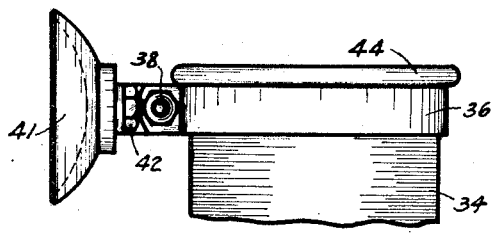
Fig. 5.
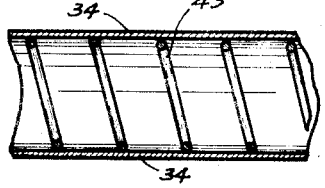
Fig. 6.
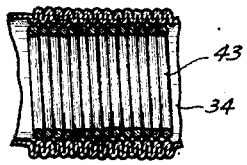
Fig. 4.
Inventor
By Mark Peterson
Arthur H. Sturges  Attorney Patented July 21, 1936

2,048,217

UNITED STATES PATENT OFFICE 2,048,217

WINDSHIELD HEATER

Mark Peterson, Council Bluffs, Iowa

Application December 16, 1935, Serial No. 54,639

9 Claims. (Cl. 20—40.5)

This invention relates to automobile accessories and more particularly to devices adapted to heat the windshields of motor vehicles.

It is an object of the invention to provide means for trapping warm air delivered from an automobile heater and concentrating the air upon a selected portion of a windshield, said means being susceptible of ready adjustment for distributing said air over a comparatively large portion of a windshield in accordance with changes in the temperature of the weather and as may be desired by an operator.

Another object of the invention is to provide a device for the above stated purpose which is collapsible and adapted to be folded into a compact space for storage in a small receptacle such as the door pocket of an automobile at times when said device is not in use and which may be readily applied to any standard make of automobile air warming device.

A still further object of the invention is to provide a light weight, flexible conduit for transferring hot air from an air warming device to a windshield, said conduit being provided with extensible and collapsible means for maintaining its cross sectional area and capacity constant during all conditions of use.

Another object of the invention is to provide a device for attachment to the warm air delivering end or side of any type of air heater for an automobile, said device being flexible and having means for maintaining an unobstructed passageway through the device for said air at all times during use whereby said air may be directed upon or diverted toward or against the glass of a windshield for altering the temperature of said glass.

Air warming devices of the type mentioned for the interior of an automobile body are generally mounted within the body of an automobile or in communication therewith. When in said body they are secured to the dashboard thereof and some types of said devices are positioned between the dashboard and the instrument board requiring comparatively long conduits and in instances where said conduits are of a flexible nature, bind against the bottom edge of the instrument board in a manner to close said conduits and prevent the conduction of hot air from the warming devices to the windshield.

With other types of warming devices which project beyond the instrument board the length of the conduit required therefor is comparatively shorter, and it is an object of the present invention to provide a device for the purposes stated which automatically adjusts itself longitudinally to an operating fit with respect to the particular environment in which the device is placed.

It is well known that during certain seasons of the year ice and snow become lodged upon the outside of the windshields of automobiles, also vapor gathers upon the inside surfaces thereof, and in a manner tending to make driving of an automobile dangerous and a still further object of the invention is to provide a simple, inexpensive device which may be readily installed upon or connected to any type of a device for delivering warm air to an automobile body for substantially obviating driving hazards resultant from said causes.

With the foregoing and other objects in view, the invention will be more fully described hereinafter and will be more particularly pointed out in the claims appended hereto.

In the drawing wherein like symbols refer to like or corresponding parts throughout the several views:

Figure 1 is a sectional view of a fragment of an automobile body provided with an embodiment of the present invention.

Figure 2 is a perspective view of an embodiment of the present invention in a collapsed, unfolded condition, the dotted lines of said figure illustrating the extensibility of a prefered conduit employed.

Figure 3 is a side view of a fragment of said conduit and of a means for attaching it to selected portions of or adjacent to a windshield glass.

Figure 4 is a plan view of the attaching means shown in Figure 3.

Figure 5 is a sectional view of a fragment of said conduit in an extended position.

Figure 6 is a sectional view of a fragment of said conduit in a collapsed or folded condition.

Referring to the drawings, 20 indicates generally an automobile body having a dashboard 21 separating the engine compartment 22 from the driver's compartment 23 or the interior of the body of the vehicle, the latter being provided with a warming device 24.

The warming device may be of any conventional hot air or hot water type having a casing 25 usually secured to the dashboard by means of bolts 26 and is usually placed between said dashboard and the cowl or instrument board 27 and below the glass windshield 28.

The new device preferably includes a hood or bag or scoop 29, preferably formed of flexible cloth. If formed of cloth or similar fabric the mount 30 is provided with a resilient gathering means such as a spring or elastic 31 which may be positioned within the folded hem 32 adjacent the outer edge of the bag or attached to said edge in any suitable manner. It will be understood that the bag 29 is adapted to be placed over the casing 25 and that the said resilient means secures the mouth of the bag snugly about said casing whereby warm air may enter the bag. The scoop 29 may be provided with resilient fingers or other suitable means for positioning the said member operatively with respect to a warm air delivery device of an automobile or to the particular device shown in Figure 1.

The end of the bag 29 oppositely disposed with respect to its mouth is provided with a restricted portion 33 in communication with a flexible fabric conduit 34.

Means are provided for attaching an end of said conduit adjacent a windshield which may consist, as best shown in Figure 4, of an interiorly disposed stiffening ring 35 and an outer clamp ring 36, the latter having at each of its ends an outwardly turned ear 37 provided with suitable apertures for the reception therethrough of a bolt 38 having a nut. By rotating the nut upon the bolt the ears of the ring may be drawn toward each other.

Arms 39 provided with tangs 40, the latter having apertures for the reception of the bolt 38, are carried by and between the ears of the ring 36. The arms 40 at their outer ends are each provided with a rubber vacuum cup 41 secured to the arms by any suitable means such as the bolts 42, said arms being adapted to be rotated upon their pivotal point or the bolt 38 for adjusting the end of the conduit 34 with respect to the windshield glass 28 as later more particularly described. Other attaching means for said purpose may be employed.

Means are provided for maintaining the capacity of the fabric conduit constant, preferably including a coiled wire spring 43 which is positioned within or about the conduit 34, one end thereof being secured suitably by means of stitching or otherwise to the conduit adjacent its junction with the bag 29. The outer end or end coil of the spring 43 is secured to the outer end of the conduit 34 and within a suitable hem 44 thereof, whereby said end coil projects beyond the clamp ring 36 and the inwardly positioned ring 35. The ends of the clamp ring being drawn together the spring 43 becomes compressed by said ring, the last or end coil of the spring not being compressed and of larger diameter than the main body portion of said spring, locks the latter with respect to the outer open end of the conduit as shown in Figure 3, providing a stiff mouth for the conduit for directing air passing therefrom for purposes later explained.

The bag 29 and the conduit 34 is preferably made of semi-porous cloth whereby hot air will not only be conducted to the windshield from the heater but also some of said air may pass through the cloth for warming the interior of the body of the automobile adjacent the floor thereof and also warm the lower limbs of the operator.

In operation the mouth 30 of the new device being attached to the casing 25 as heretofore mentioned, the conduit 34 is extended from its normal or collapsed position, as shown in Figure 2, upwardly towards the windshield and the open end of said conduit selectively positioned with respect to the glass by means of pressing the vacuum cups 41 against said glass. Assuming that the weather is moderate or the operator so desires, the open end of the conduit 34 may be placed at nearly a right angle with respect to the glass 28, as shown in Figure 1, whereby the air from the warming device will become spread over a comparatively large area of the glass and at desired times the mouth 35 of the heater may be moved to the dotted line position 35' thereof for causing hot air to become concentrated and impinge directly upon a selected portion of the windshield for melting a large quantity of snow or ice from the outside of said shield, said mouth at this time being in substantial parallelism with respect to said glass. Also, while driving, the operator may free the vacuum cups from the shield, and using a free hand, move the mouth of the conduit over the entire surface of the shield for clearing the latter of all debris.

It will be noted that the coiled spring 43 maintains the capacity of the fabric conduit constant at all times and should the operator's knee, hand or the like strike said conduit or press the same against the lower edge of the cowl board 27 the capacity of said conduit will not become altered thereby.

For certain types of installations the air scoop or hood 29 may be omitted and an open end of the conduit 34 placed against or operatively secured to the face of the heater 25 or other device for delivering warmed air to said conduit.

It is obvious that various changes and modifications may be made in the details of construction and design of the above specifically described embodiment of this invention without departing from the spirit thereof, such changes and modifications being restricted only by the scope of the invention as hereinafter claimed.

What is claimed is:—

1. An automobile windshield heater comprising a flexible bag having resilient means adapted to position the mouth of the bag about the casing of an automobile warming device, an extensible conduit in communication with the bag, a coiled extensible spring in the conduit for maintaining the capacity thereof constant during use, and means for attaching the conduit in an operative position with respect to a windshield.

2. In an attachment for an automobile having an air warming device therein, a flexible bag having a resilient means for securing the mouth of the bag to said warming device for conducting warm air from said device to the bag, an extensible conduit in communication with the bag, collapsible and extensible means for maintaining the cross sectional area of the conduit constant throughout its length for permitting a normal flow of said air through said conduit, and adjustable means for attaching the open end of said conduit to the windshield of the automobile for directing a selected quantity of said air against said shield.

3. In combination, an automobile having means for delivering warm air to the interior of the body of the automobile, a fabric conduit, a coiled wire associated with said conduit for maintaining the cross sectional area of said conduit constant, means for securing an end of said conduit in cooperating relation with said warming means, and means for securing the other end of said conduit adjacent the windshield glass of said automobile for directing air from said warming means against said glass.

4. In combination, an automobile having means for delivering warm air to the interior of the body of said automobile, an extensible and contractible conduit, a coiled spring in the conduit having its ends secured to opposite ends of said conduit for providing a constant conducting capacity thereof, an air scoop at one end of said conduit, means for securing said scoop to said air delivering means, and means for securing the other end of said conduit adjacent the windshield glass of said automobile for diverting air from said air delivering means to said glass.

5. In a device for the purposes set forth comprising a fabric conduit, a scoop at one end of said conduit, means on the scoop for a cooperative fastening to the delivery side of a hot air heater for an automobile, means for attaching the other end of said conduit adjacent the windshield glass of an automobile, and a coiled wire disposed longitudinally of the conduit for maintaining its transverse area uniform throughout its length.

6. A windshield warmer for a hot air heater for an automobile body comprising, an extensible and contractible conduit, fastening means for the conduit adapted to position an end thereof in cooperative relation with said heater for receiving warm air from the latter, means for securing the other end of said conduit adjacent to a windshield for delivering said air to the windshield glass, and a coiled spring having its end secured to opposite ends of said conduit, the coils of said spring adapted to maintain an unobstructed passageway for said air through said conduit.

7. A windshield warmer for the purposes set forth comprising, a fabric conduit, a scoop at one of said conduits having means for securing the scoop to the air delivery surface of a hot air heater of an automobile, means for attaching the other end of said conduit adjacent the windshield glass of an automobile, and a coiled wire disposed longitudinally of said conduit for maintaining a uniform transverse area of said conduit at all parts of its length.

8. A windshield warmer for a hot air heater for the interior of an automobile body comprising, a fabric conduit, means for attaching one end of said conduit to the air delivery side of said heater for transferring warm air from the heater to the conduit, and a coiled wire disposed longitudinally of said conduit for maintaining it of uniform air conductive capacity throughout its length, the other end of said conduit adapted to be placed against said windshield for altering the thermal condition of the glass thereof.

9. As an article of manufacture, a scoop having a mouth adapted to be operatively engaged with a heater for receiving air from the heater in said mouth, a fabric conduit joined at one end thereof with said scoop, and a wire disposed helically and longitudinally of said conduit for maintaining it of a uniform transverse area throughout its length.

MARK PETERSON.